United States Patent Office 2,736,144
Patented Feb. 28, 1956

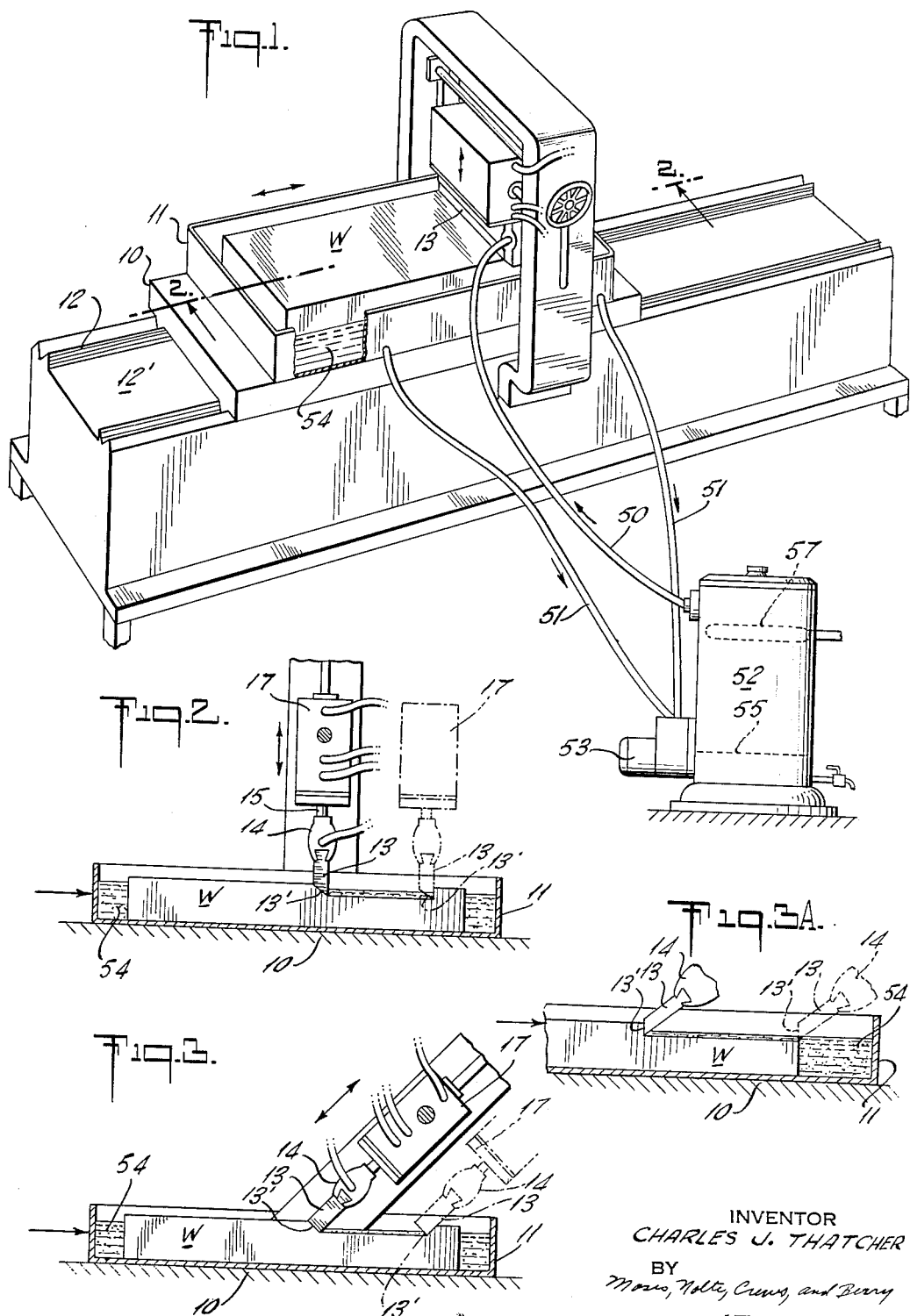
Feb. 28, 1956     C. J. THATCHER     2,736,144
MACHINING BY HIGH-FREQUENCY VIBRATORY ABRASION
Filed Nov. 20, 1952     3 Sheets-Sheet 1
INVENTOR
CHARLES J. THATCHER
BY
ATTORNEYS Feb. 28, 1956 C. J. THATCHER 2,736,144
MACHINING BY HIGH-FREQUENCY VIBRATORY ABRASION
Filed Nov. 20, 1952 3 Sheets-Sheet 2
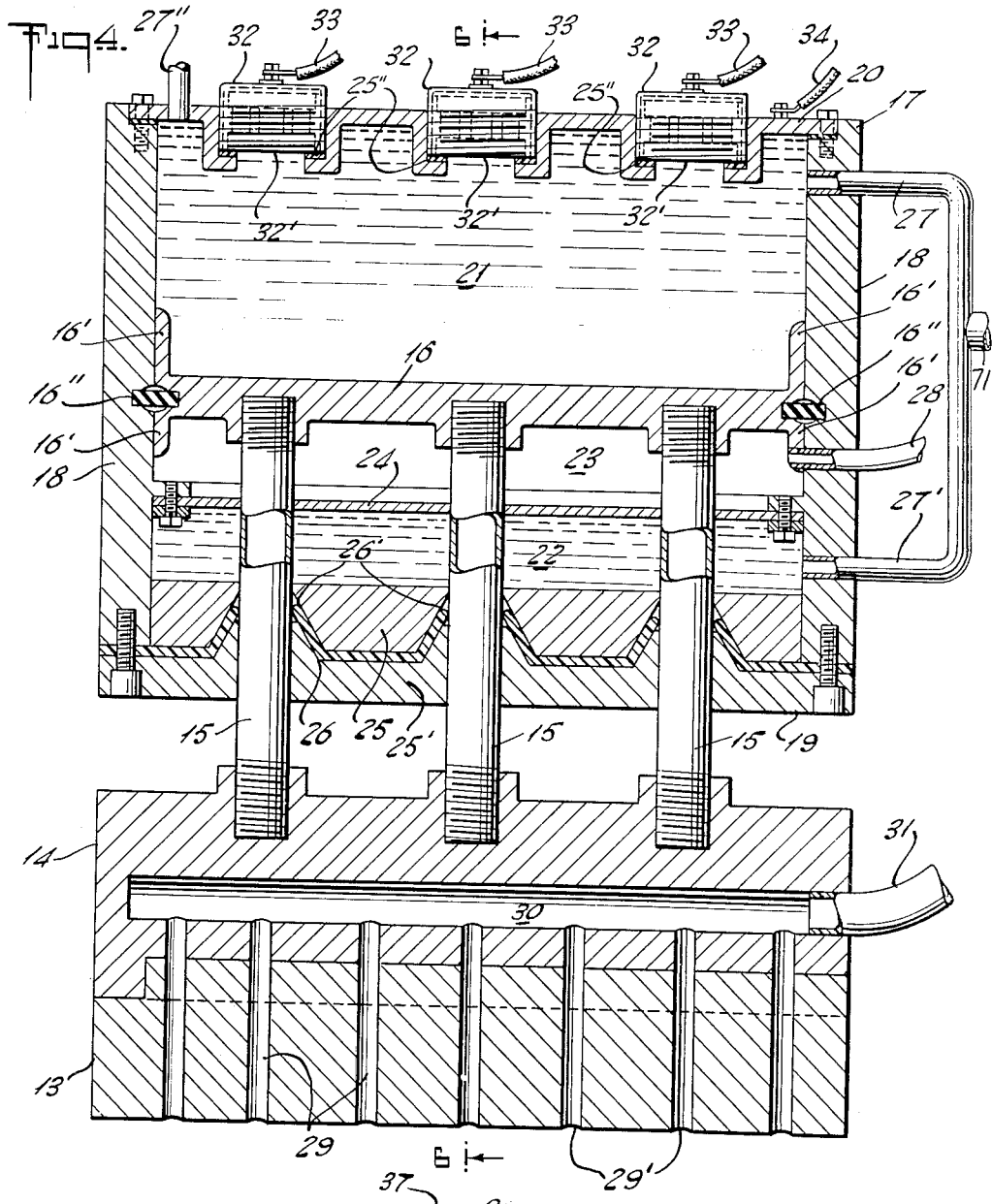
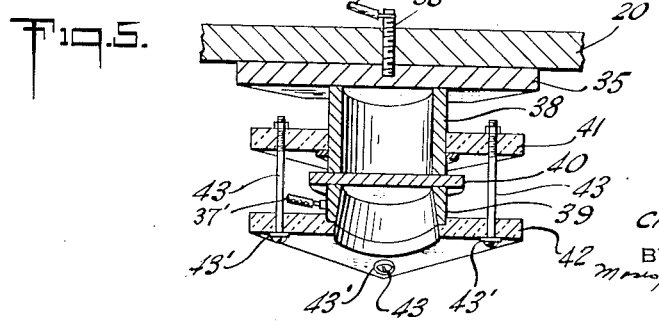
INVENTOR
CHARLES J. THATCHER
BY
Moses, Nolte, Crews, and Berry
ATTORNEYS

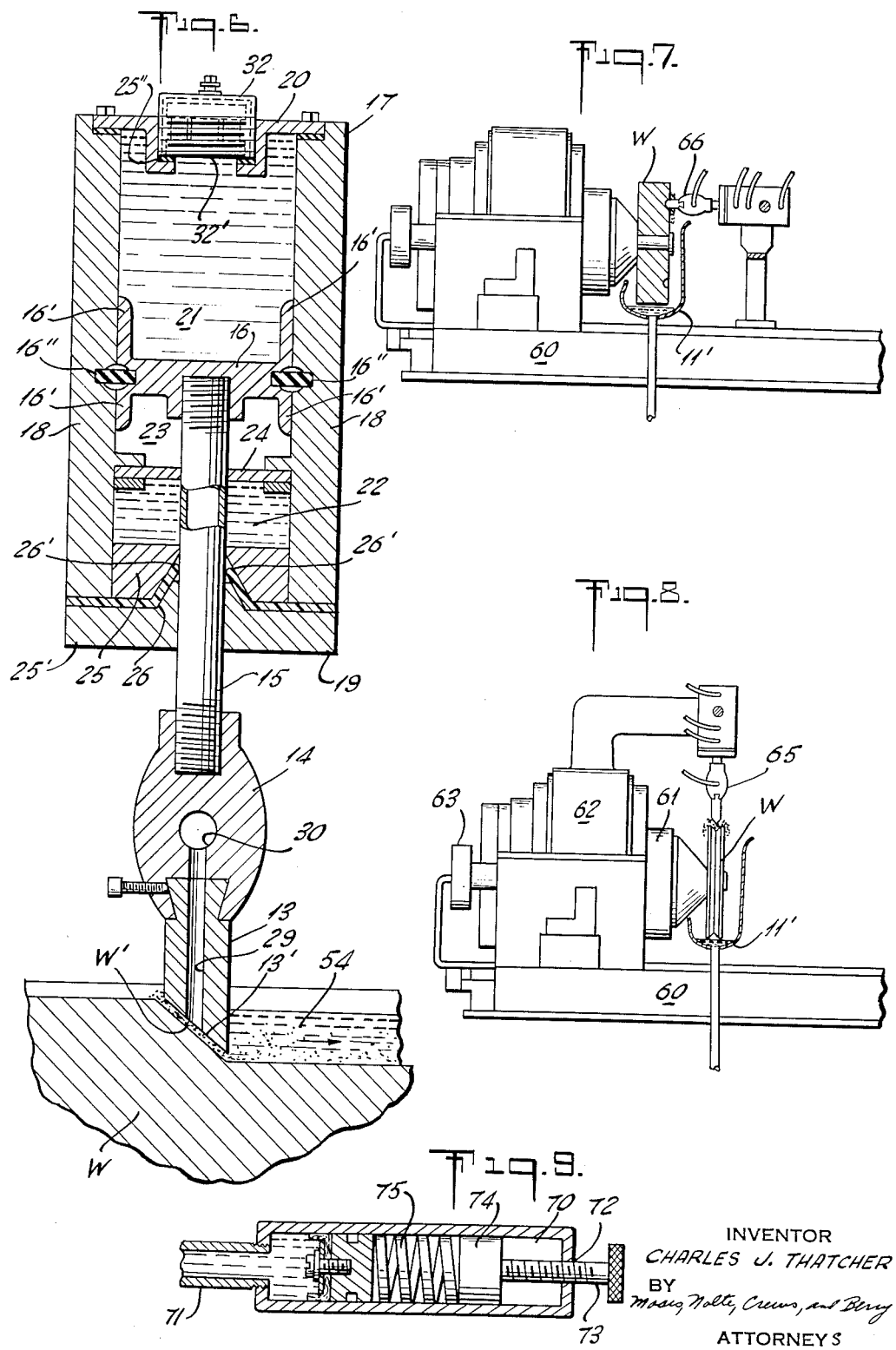

2,736,144

MACHINING BY HIGH-FREQUENCY VIBRATORY ABRASION

Charles J. Thatcher, New York, N. Y., assignor to Robert O. Thatcher

Application November 20, 1952, Serial No. 321,579

23 Claims. (Cl. 51—64)

This invention relates to a novel method and apparatus for shaping of metals and other hard substances by the use of high-frequency vibratory abrasion developed in and/or applied in milling machines, lathes, shapers, etc.

Heretofore, in the art of shaping metals and similar substances, it has been conventional practice to continuously move a cutter and a work piece toward each other, either continuously advancing the cutter or work piece to new positions along the surfaces thereof, or by slow reciprocation of the cutter or work through a relatively long path of motion. The cutter has been either of the blade or point type or of the abrasive type.

For the high speed shaping of hard metals, etc., it has been almost imperative to use tools made from very hard substances such as tungsten or other cemented carbides or diamond wheels. In fact, the use of diamond wheels has hitherto been, or has recently become practically imperative for the shaping or reshaping or sharpening of Carbolloy and similar tools composed of carbides. However, the supply of industrial diamonds for this purpose is controlled by a foreign syndicate which releases diamond materials suitable for such purposes only in restricted quantities which have recently become totally inadequate to supply the domestic demand. This has resulted in a limitation on the amount of machining which can be done in the United States, and has and will increasingly handicap preparedness efforts.

It is an object of this invention to overcome this handicap and to provide a new and novel high speed tool for general use in machine-shop operations which can be used without change, or only minor changes, in machines presently used for shaping of metals and similar hard materials.

It is a further object of the invention to thus dispense with the necessity for the use of diamond wheels or of tungsten or other cemented carbide tools in high-speed machining of hard metals, etc., and also to dispense with the necessity for use of cutting oils in such machine operations.

It is a further object of the invention to make it feasible to speed up machining operations of the type hereinbefore specified, to an extent heretofore unattainable and for reasons which will hereinafter be explained and amplified.

To this end, it is a further object of the present invention to provide a shaping method and apparatus involving actuation of the working tool through a relatively short locus of motion, but with relatively high oscillatory movements accompanied by relatively high velocities.

In accomplishing these and other hereinafter mentioned objectives, the invention comprehends the rapid oscillation of comminuted hard abrasives such as aluminum oxide, silicon carbide, or boron carbide, suspended in a film or stratum of a liquid of low viscosity such as water, and the rapid flow of such vibrating abrasive suspensions between the surface of the substance to be shaped and a rapidly vibrating, suitably shaped tool, which may be blunt, and held with its operative surface constantly adjacent to, but not usually in actual contact with, the surface of the work piece.

The high frequency vibration of the abrasive particles is established by sonic, or preferably ultrasonic vibration of the tool end which propels or hammers the abrasive particles against the immediately adjacent surface of the work piece, which is thereby subjected to myriads of chipping actions each second; a smooth and rapid cutting of the hardest materials thereby results.

Cutting by such high-frequency vibratory abrasion has been previously used and patented, but has been confined heretofore to the polishing or etching of surfaces or to the drilling of holes or cavities in very hard metals, gems, glass or the like. Thus the patent to C. H. Griss, No. 2,504,831 for an Apparatus for Engraving Glass, patented April 18, 1950, is an example of such a prior art application of high-frequency vibratory abrasive action. There has been no successful attempt, known to applicant, to extend the use of this novel form of abrasion to the rapid removal of relatively large volumes of hard materials, such as is effected in milling machines or by the turning of such materials in lathes. This limitation in the application of the recently developed abrasion phenomena has, in part, been due to the realization by prior workers in the art that tools of necessary large cutting surface and power have too great weight and consequently too much inertia to be vibrated at high frequencies practically, with single or even multiple high-frequency vibratory elements such as magneto strictive rods.

Realizing this limitation, Griss, in columns 8 and 9 of his patent, beginning at line 57 of column 8, describes an assembly of a plurality of such rods arranged so as to give a tool which may have a working face several inches in diameter. The energy delivered, practicably, even by such a multiple vibratory element, as Griss realized (see lines 1–9, col. 9), is, nevertheless, insufficient to provide that considerable amount of energy which is requisite for high-speed shaping operations in a milling machine of any considerable size. It will later be established that by means disclosed herein the total available energy may be increased one hundred times or more above that obtainable by the Griss device.

In order to overcome these hitherto insurmountable limitations to the use of high-speed vibratory abrasion, I add to the construction or design of tools suitable for this purpose a power amplifying transmission element, which may comprise a body of a suitable liquid, such as transformer oil, confined in a heavy-walled container in which the multiplication of applied power can be effected on the principle of the hydraulic press. Application of the principle of the hydrostatic paradox here makes it possible to multiply by many times the amount of pressure applied in a power unit in which the relative areas of the tranducer and the working surfaces are suitably related.

I also modify the prior practice of this art by making provision for a more rapid and copious flow of thin, liquid abrasive slurry through the narrow space between the operative face of the tool and the work surface; and I further provide means for removal of the detritus of abraded metal particles from the liquid with sufficient rapidity to maintain a return flow of abrasive slurry substantially free of metal detritus, so that its abrasive cutting action in the operative region of the device may be maintained, unimpaired, by any clogging effect of extraneous, accumulated, softer metal particles. The detailed structure whereby these improved provisions are obtained will be described hereinafter.

Any of the various well-known forms of high frequency mechanical reciprocation generators may be used in my improved device; but for technical reasons I prefer magneto-striction or piezo-electric oscillators, and especially the latter, which I have shown, for illustrative purposes only, in the drawings.

Further objects and advantages of the invention will be apparent to those skilled in the art from the following description of the preferred embodiments thereof, described with reference to the accompanying drawings, in which Figure 1 is a perspective view of a milling or planing machine embodying the present invention;

Figure 2 is a fragmentary sectional view of the machine taken on the line 2—2 of Fig. 1 and showing the partially machined work piece and its supporting table;

Figure 3 is a similar view showing the tool placed at a different angle than Fig. 2;

Figure 3A is another view of the work piece with the approach of the tool from a third direction;

Figure 4 is a larger scale, detailed vertical sectional view of the tool itself;

Figure 5 represents a sectional view of an alternative form and mounting of the vibratory generator to that shown in Fig. 4;

Figure 6 is a transverse vertical section of the tool taken on the line 6—6 of Fig. 4;

Figures 7 and 8 are diagrammatic views showing alternative applications of a tool as employed for turning hard materials in a lathe; and Figure 9 is a sectional view of a recoil and pressure regulating chamber.

Referring to the drawings, Figures 1 to 4 illustrate a machine suitable for shaping plane surfaces of material, such as metal plates. The work, designated by the reference character W, is supported on top of a table 10, if desired it is affixed thereto in any suitable manner. The table 10 is slidably supported on ways 12 formed on top of a bed 12', and table 10 is reciprocated thereon in any suitable manner well known to the art, preferably by means of fluid pressure operated mechanism. This mechanism is not illustrated herein as it does not, per se, form a part of the present invention, and is well known in the art.

In the machine illustrated the operation being performed in Figures 1, 2, 3 and 3A, is that of milling the work piece W, and the improved tool blade 13 and its actuating mechanism is shown in both its original position (in dotted lines) and one later operative position, in engagement with the upper surface of the work W. The cutting tool 13 is attached through tool holder 14 to the lower ends of the vertical tubes 15 (Figure 4) which connect the holder 14 to a fluid operated piston 16. The piston 16 thus affords the means of vibrating the tool blade 13 at any desired frequency of oscillatory movement of the vibration generators such as the piezo-electric crystals enclosed in shells 32 and terminals 32' mounted in the upper lid of box 17.

Vibrations of the tool of small amplitude but high frequency, accompanied by movement of the work, in a plane divergent to that of the path of movement of the vibration tool, produce a rapid cutting of the surface of the work along the line of contact of the tool face and the work; the vibration need only to be of the order of a few thousandths of an inch in amplitude, and to have a frequency from four hundred to thirty thousand cycles per second, or even more, or from eight hundred to sixty thousand motions per second, or more, to produce the desired result. It will be understood by those skilled in the art from the foregoing description that these vibrations may be produced by a number of different means and that they may be imparted to the tool by the piezoelectric transducer above referred to.

For the purposes of this invention the angular relations of the working face of the tool and the surface of the work piece different fundamentally from that of any prior art device—as is illustrated by Figs. 2, 3 and 3A. As shown in Figs. 2 and 3 the plane of the blunt working face 13' of the tool 13 approaches and penetrates into the surface of the work W initially in such a way as to form an acute angle with that surface at the moment of penetration. The first contact, in other words, between the tool and the work piece surface is on an edge of the working face of the tool; and the initial incision in the said surface is V-shaped in either of the angles of tool advancement shown, respectively, in Figs. 2 and 3. After the tool has penetrated into the surface of the work far enough to just about cover the working face of the tool, then movement of the work piece laterally is instituted, and in a direction and along a plane which will preserve the area and angle of contact between the tool face and the freshly cut surface of the work. Prior to this newly instituted movement of the work piece it has been maintained quiescent—as it is in the prior art drilling operations.

In my novel method of shaping hard materials disclosed herein the working face of the tool advances toward the shaped surface at an angle (and not parallel thereto) as it does in drilling, lapping and polishing operations of the prior art. In other words, in this novel method of employing high frequency, vibratory abrasion, the abraded surface at all times during advance of the tool and work piece with respect to one another makes an angle with the axis of the tool.

In Fig. 3A the working face 13' of tool 13 advances from an end of a work piece at substantially an angle of 90° to the plane of the surface to be shaped.

It will be seen that in each of the constructions shown in Fig. 3 and Fig. 3a the axis of tool movement or direction of vibration of the tool towards and from the work face is inclined at an obtuse angle to the direction of translatory movement between the work piece and the tool. If the axis of the tool movement is thus inclined, the plane of the work face or of the tool end may be either oblique to the direction of translation, as shown in Figs. 2 and 3, or at right angles thereto, as shown in Fig. 3a. However, if the axis of tool vibration is at right angles to the direction of translation, as shown in Figs. 2 and 7, or tangential thereto, as in Fig. 8, then the angle of the work face must be acute to the direction of translation.

In each of the arrangements shown it will be seen that there are components both of frontal, direct pressure and of parallel sliding pressure between the tool face and work face, both of which are inclined at an acute or a right angle to the direction of translation, but that the work material removal is nevertheless progressively parallel to the work surface. Consequently the cutting action by the abrasive particles resulting from the tool vibrations is normal to the work face cut and thus causes a progressive removal of material from the work surface along a continuous, straight or undeviating circular line the latter as illustrated by the circular groove cut by the lathe tool in Fig. 7, as the movement of translation between the tool and the work piece progresses.

Thus, in applicant's device, there is a true machining operation in which material is, in effect, shaved in strips from the surface by abrasion, due to movement of translation and sliding contact between the tool and work piece, similar to that which occurs in ordinary milling, planing or turning—all of which shave or peel strips of material from and parallel to a work surface; in the prior art the removal of the work surface has been mere localized penetration as in head-on drilling or engraving.

As shown in Figures 4 and 6, which are approximately half size, the relation of the area of the piston 16 to the combined area of the three exposed faces, 32', 32', 32', of the vibrator generator unit is about 28 to 1; wherefor about 28 times as much force will be transmitted hydraulically to cutting blade 13 from piston 16 as would result from direct attachment of blade 13 to the vibration generators themselves. But the upper face of the piston can, of course, be increased both in length and width above the dimensions illustrated, with corresponding greater increase in the power of the cutting blade. And employment of a double row of three crystals in each row, instead of a single row as shown, will, in itself, double the force of the generated vibratory impulses transmitted hydraulically to the liquid; and one can also double the width of the piston and thereby the pressure it receives, hydraulically from six crystal generators. Consequently by this novel expedient it is practicable to multiply the pressure to 112 times that obtainable by direct attachment of blade 13 to the exposed vibrating faces 32' of three piezo-electric crystals. And, similarly, my vibratory cutting tool can be more than one hundred times as powerful as that obtainable by the arrangement illustrated in Figure 9 of the cited Griss patent, the most powerful prior art tool of this character known to me. Amplitude of movement of the cutting tool will be reduced somewhat by hydraulic pressure amplification, it is true; but since actual contact of the tool end with the abraded surface at some time during vibration is practically unavoidable, oscillations of extremely low amplitude—at very high frequency—will be less exposed to damping effects and consequently be most effective. Frequency will not be altered by hydraulic amplification of force.

In the embodiment of the invention illustrated in Figures 1 to 6 the vibrations of the cutting blade 13 are imparted thereto from elements enclosed within the generator box 17; and, as shown in detail in Figures 4 and 6, this box 17 is or can be made up of a rectangular shell having four rigid sides 18, the shell being closed at each end by cover plates 19 and 20, and held firmly and leak-proof even against considerable internal pressure by bolts and suitable gaskets at all joints, as shown in Figure 4. Generator box 17 (Figures 4 and 6) is provided with a close fitting piston 16, having projecting upstanding edges 16', as shown, in order to maintain a snug fitting, bearing surface of considerable width between piston 16 and wall 18, so that the oil 21 or other suitable hydraulic liquid will not tend to leak from upper compartment 21 to compartment 23 beneath piston 16 which (23) contains air or a suitable gas or vapor under pressure. Piston rings, e. g. of neoprene, 16'' may be so installed in 16 or 16' as to seal the joint between 16 and 18 and still allow movements of low amplitude by flexure of rings 16''. During operation of the unit, piston 16 will vibrate at high frequencies numbered in thousands of cycles per second, but with low amplitude of a few or a fraction of one-thousandth inch which will be attained without substantial friction by flexure of the elastic piston rings.

Since the object of the design disclosed herein is to provide sufficient power to overcome inertia of vibrating parts of the cutting instrument, it is desirable so to select materials and design of these parts that the total weight of the vibratory elements, and consequently the inertia, is a minimum. The solid vibratory elements of the cutting tool comprise the piston 16, sides 16', and tubes 15 which connect piston 16 to hollow tool blade holder 14 and finally to tool blade 13. Blade 13 is preferably made from cold rolled steel or some other tough material which may be softer than work piece W or the comminuted abrasive grains suspended in the abrasive slurry 54. Parts 14, 15 and 16 can be made of any suitably low density material having sufficient strength—such as an aluminum or magnesium alloy or even plastic materials.

Piston 16, as shown, is not hollow; but it can be preferably so constructed, to minimize its weight and to permit flow of a cooling liquid, such as the slurry 54, therethrough, to provide for cooling of the entire vibration generator when necessary. To these ends, also, connectors 15 are preferably tubes rather than rods; and tool holder 14 is provided interiorly with a channel 30 having a number of small bore downwardly extending branches 29, from the outer ports 29' of which re-circulated abrasive slurry issues in rapid, copious jets into the narrow space W''' (Figures 2, 3, 4 and 6) between the blunt end 13' of tool blade 13 and the surface of work W' (Fig. 6) removed by the abrasive action. Ports 29' may be constricted to openings of very small diameter, say one-thirty-second of an inch or even less.

Connectors 15 may be attached to piston 16 and tool holder 14 by suitable screw threading at their ends as shown or in any other appropriate manner. These connector tubes 15 extend through seals or stuffing boxes in the lower end 19 of box 17, arranged there in such a manner as to prevent leakage of any fluid from the interior of box 17, which fluid—either of air or oil or an emulsion thereof—will be confined, leak-proof, by the gasket 26, preferably of neoprene, clamped tightly as shown between the upper 25 and the lower section 25' of the bottom 19 of the box 17; these sections have conical projections in the lower section and corresponding cavities in the upper section surrounding the openings in lower section 25' for the connector tubes 15, whereby the intervening edges 26' of the openings in the gasket will be pressed tightly around each tube so as to prevent seepage of oil, air or emulsion between the gasket opening and the tube. Nevertheless, vibratory movements of a few thousandths of an inch to and fro can occur, unchecked and undamped, as a result of the concomitant flexing of the neoprene edges of the gasket openings; the upper surface of each conical projection of section 25' is to be filed or cut away sufficiently to form a blunt, truncated cone, as shown, thereby to afford a clearance space for such flexing of the gasket edges.

Above upper section 25 of the bottom 19 of the box is a section 22 topped by partition 24, as shown, which section (22) is to be filled with liquid, e. g., oil, through inlet tube 27'. Above partition 24 still another section 23 is provided, which is to be occupied by air or other suitable gaseous medium introduced through inlet 28. Section 23 is to be maintained under considerable pressure, which may mount up to many atmospheres, the pressure of which will, of course, be transmitted to the layers of oil in sections 21 and 22 by slight movements of piston 16 and partition 24. These pressures should be in equilibrium before use of the device, and balance should be and, it is believed, will be automatically maintained. The exact optimum pressure will be fixed for each instrument by calibration; it will be that pressure of the oil and gaseous sections which give resonance and consequently maximum amplitude of high frequency vibration and will have to be determined initially for each set of transducers vibrating at the optimum frequency.

The design and dimensions of the shell of the device must be such that it will safely withstand an internal pressure of many atmospheres; and it may be that reinforcing bands (not shown) will have to encircle the sides and ends of the box to strengthen it. It is believed that leakage through joints can be prevented by use of suitable gaskets as shown and heretofore described.

In this device the high frequency oscillations of tool blade 13 are caused by increase and decrease of volume, first of the exciting primary vibratory element 32, and then by the movements of the transmission liquid and piston coupled thereto caused by the said volume changes. Wave propagation through the said liquid is not relied upon, primarily, in this device wherein it may differ in many respects from those heretofore used for this or similar purposes. For this reason the exciting element, the transducer, should preferably be so mounted and positioned within the box that its dilations are unconfined as much as possible, giving the maximum degree of undamped volume changes. To this end it is desirable to utilize as much as possible both the longitudinal and shear movements of the transducer.

It may be that under some conditions the hydraulic fluid will transmit and amplify the force of the vibrations of the transducer more efficiently if an emulsion of a gas, such as air, and oil is used instead of oil alone. Air bubbles in oil, it is known, under proper pressures to produce resonance in the bubbles or the total emulsion, will give more powerful compressional waves. I therefore include within my invention the use of an emulsion in the space of sections 21 and/or 23—if, upon trial, it is found that a more powerful tool is thereby obtained. And replenishment of oil or emulsion and filling of the sections 21 and 22 with the hydraulic fluid will be facilitated by provision of an outlet tube at a high point in the wall of the respective container sections, as is illustrated at 27″ in Figure 4 of the drawings.

For obvious reasons employment of the method and devices disclosed herein may advantageously include a preliminary roughing operation followed by a more precise shaping to desired dimensions and shape. In this way the removal of the bulk of the hard material by the shaping operation can be greatly accelerated, as by more rapid movements of the work piece and its supporting table in milling operations, or more rapid revolution of the work piece in turning in a lathe. The worker in the art will, of course, be able to adjust such conditions of operation to the exigencies thereof.

The generator for high frequency vibrations used by way of illustration in Figures 4 and 6 is a plurality of piezo-electric crystal sections, which may be made up in the form of a mosaic crystal section, for example of quartz or Rochelle salts, mounted between terminal plates, as shown, and enclosed in shell 32 which covers the top and peripheral surfaces of the mosaic of crystal sections but does not extend over the lower surface thereof. A source of suitable alternating high frequency electric impulses is connected by cables 33 and 34 respectively to the upper terminal of the unit and to its lower terminal, pains being taken suitably to insulate the connectors and shell 32 so as to avoid short-circuiting. The unit so assembled and connected may be mounted in a suitable cover plate 20 of the generator box, as shown, being supported on a suitable gasket 25″ of elastic material such as soft copper. By this means, when the crystal is energized, the lower terminal will vibrate in a shear movement; and since it is in immediate contact with a suitable liquid 21, such as transformer oil, the impulses of the lower terminal will cause alternating increase and decrease in the total volume of the chamber containing the liquid 21, which fluctuation will be transmitted thereby to the piston 16 and therefrom through connectors 15 and blade holder 14 to the blade 13, all as previously described.

An alternative and perhaps preferable form of high frequency vibration generator is that shown in Fig. 5 in which nearly all of the exterior surfaces of the piezo-electric crystals or mosaic are exposed to, and in direct contact with the transmission liquid 21. In this form, a brass plate 35 is attached, as by screws, into the upper cover plate 20 of the box and is connected to the source of electric energy by a threaded electrode 36 screwed into the plate 20, and brass fitting 39 and by the lead wire cables 37 and 37′. The crystal itself 40 is held in position in the liquid 21 by brass ring 38 which is threaded into brass plate 35 and projects through and is attached to a non-conducting plate, e. g., of Lucite, 41; the crystal 40 is held in contact with the blunt end of brass ring 38 by means of the compression between its end, and a brass fitting 39 which contacts and presses against the opposite lower side of crystal 40 as shown. This compression is effected by means of the plates 41 and 42 which may both be of Lucite or other non-conductive strong material and held in position by means of the four screws 43. A washer of yielding material as 43′ is supplied at each screw end so as to provide for vibrating movement of the brass fitting 39 and plates 41 and 42, and of the crystal 40, all due to alternate expansion and contraction thereof occasioned by the electrical impulses.

The fitting 39 is shown as being conical in interior diameter, the purpose of which being to provide for divergence of any compression waves occasioned by the shear vibrations of the crystal 40.

By this mounting the total effect of all alternate expansions and contractions of crystal 40 will be transmitted to the transmission liquid 21 from all exterior surfaces of the crystal, excepting that portion of the upper surface thereof which is enclosed within the brass ring 38. That enclosure will contain air, which, as is well known, is superior for reflecting compression waves back to the surface of the vibrating crystal and to reinforce, by resonance, its own vibratory energy. Longitudinal vibrations of crystal 40 are also transmitted by this mounting to the transmission liquid 21.

During the operation of the tool a suitable liquid such as water containing finely comminuted abrasive such as boron carbide in suspension is circulated through a tank 52 through connecting tubes 50 and 51 and electric pump 53 in such a way as to flow from 52 through tube 50 and tool holder 14, which is provided with central channel 30 as shown in Figures 4 and 6; and from this central channel the small perforations 29 lead the suspension to the face 13′ of the blade 13. The heavy metal detritus settles at the bottom of the tank in a layer as shown at 55; and if necessary a cooling coil 57 for cooling the liquid and the parts of the tool and machine through which it flows can be mounted in the upper portion of the tank 52, as shown. By this means a rapid flow of clarified abrasive liquid will be maintained at all times and will flow with such force through the free space between the cutting face of tool 13 and the face of the works W being cut as to forcibly remove the metal detritus 54 as rapidly as it is formed.

It will be understood that all parts of the tool which vibrate are to be so designed and constructed as to have a minimum of weight and consequently of inertia, to which end light alloys of magnesium or aluminum and a hollow piston 16, tube 15 and tool holder 14 may and will be preferably used. The blade 13 itself should be constructed of metal, preferably cold rolled steel or any other suitable metal, which is preferably softer than either the work W or the abrasive 54. The material of the blade 13 itself will thus be expendable but it will last for many hours of work.

The tool blade 13 can be mounted in a tool holder 14 by a dove-tailed engagement and fastened by a set screw as shown, or by any other suitable means whereby firm holding of the blade 13 under the high frequency vibration will be maintained.

Since the material of the blade can be of relatively soft metal it will be much more easily shaped—without diamond wheels, etc.—than are tools of cemented carbide, and since the material of the blade will be intrinsically cheaper and more plentiful, the power tool of this invention is capable of effecting substantial economies in the machine tool industry.

Figures 7 and 8 represent graphically means whereby the tool can be used for turning of metals or similar hard materials in lathes, the cutting being either lateral or peripheral. The end of the blade 13 will be suitably shaped, and the work blank can revolve at lower speeds than those heretofore used. As shown, the work W is surrounded by a trough 11′ which collects the cutting fluid as it is spattered from the work and this trough will be connected in turn with a tank 52 and its pump and accessories.

It may be that under some conditions greater power will result if an emulsion of a gas and oil or other liquid is used instead of oil, etc., as the hydraulic fluid 21 in the power tool of this invention. It is known that high frequency impulses under some conditions of resonance are more powerfully propagated in an emulsion than through a straight liquid. The emulsion, to obtain this effect, must be under considerable pressure; but an internal elevated pressure of many atmospheres—one which has been found, empirically, by suitable tests to afford maximum resonance and consequently maximum power—must be maintained in any event within the generator box 17 for maximum efficiency.

Such pressures can be easily established and maintained by the provision in supply tube 27 and 28 (Fig. 4) of a pressure control and recoil chamber, shown in Figure 9. This consists of chamber 70 into the reduced end of which a fitting 71 is screwed by which it is joined to hydraulic liquid supply tube 27. The other end of chamber 70 has a threaded closure 72 which adjustably carries a screw 73. This screw forms an abutment of a fairly heavy washer 74 against one end of which a stiff spring 75 bears—thus forming a combined pressure control and recoil chamber.

The function of the pressure control and recoil chamber, which acts in combination with the gaseous pressure chamber 23, is to provide a power implement which has, as a fundamental characteristic, the confinement of a column of liquid in a conduit stopped at one of its ends by a closure such as piston 16 which, although it is necessarily movable, is backed up from its outer side by a gaseous or vapor space 23 in which said fluids are under sufficient tension to prevent piston 16 from ever departing from the adjacent end of liquid column 21, thus consolidating and maintaining the liquid column and the working parts of the hydraulic power amplifier into what may aptly be entitled a mass-unit, and producing mass-unit action, not wave movement, in operation of the device; for there results a solidarity and rigidity in said liquid column 21 which precludes formation of compressional waves by alternating internal pressure increases and decreases within the body of liquid, such as occur in sound wave power transmission.

The locked high pressure and pressure control device of Fig. 9, branching off from and communicating with hydraulic liquids chambers 21 and 22 and gaseous chamber 23, establishes and maintains the said solidarity of fluid movement and consequent mass-unit action. No prior patent in this art shows any such a device. Any tendency toward establishment of compressional sound waves in applicant's device is smoothed out and eliminated by the high pressure, recoil effect of pressure chamber 23 which totally prevents periodic, recurrent rarefactions in liquid column 21. It will be understood that the fluid pressures in chambers 21, 22 and 23 automatically balance since all communicate with the recoil chamber of Fig. 9; consequently any change in pressure in one of such chambers is instantly reflected in the others.

Under some conditions also it may be desirable to generate the high frequency impulses by the use of mechanical, rather than by electrical transducers; for thereby it is possible to apply more primary power and greater amplitude of oscillation to the hydraulic transmitting liquid column, than is readily and conveniently derived from magneto striction or piezoelectric impact vibration.

What I claim is:

1. The method of shaping metals or other hard substances by removal of material, as by cutting or abrasion in machines of the character described, which includes generating high frequency oscillatory vibrations in a tool involved in the shaping operation, keeping the tool out of contact with said substance, moving the substance to be shaped along a continuous undeviating path oblique to and transverse of the path of vibratory movement of the tool and forcing between the substance and the vibrating tool a cutting medium comprising a comminuted abrasive carried in a liquid; whereby the abrasive particles suspended in the liquid between the tool end and the confronting face of said substance are driven against said face to remove material therefrom.

2. A method of grinding and shaping a blank of hard material which consists in supporting the blank with its surface in close proximity and at an obtuse angle with relation to the axis of a blunt ended, oscillatory tool, flooding the space intervening between the portion of said blank to be ground and the blunt ended portion of said tool with a liquid containing in suspension particles of a material harder than said blank, vibrating at high frequency said particles between the blunt end of said tool and the said blank by impact between the said tool and the said liquid and producing a movement of translation between the blank and tool in a continuous, undeviating line at an oblique angle to the axis of the tool.

3. The method of shaping the surface of a hard work piece, by means of high frequency, vibratory abrasion, using a vibratory tool having a blunt planar working face and an angular edge, which comprises positioning an edge of the tool adjacent to but out of contact with the surface to be shaped and so that the planar working face of the tool is disposed close to but separated from said face to form an acute angle with the plane of said surface, advancing the tool in to said work piece in a direction and to a depth not exceeding that sufficient to cover the working face of the tool and insufficiently to establish contact between said face and said workpiece, by angular relative movement of said tool and workpiece with respect to and toward one another while varying at high frequency the pressure of approach between the said face of the tool and the surface of the workpiece, and while flooding the space intervening between the tool face and the workpiece by the act of forcing a liquid suspension of a comminuted abrasive, discontinuing said advance movement of the tool into the said surface in the first direction and thereafter advancing the workpiece obliquely toward the working face of the tool in a second direction without substantial alteration of subsequent direction of movement or the angle or area of near contact between the work and the face of the tool, and maintaining during the said second advance movement the said high frequency variations in pressure of near contact and the said flooding of the space of the points of near contact.

4. The method of shaping a workpiece of hard material with a softer tool having a planar blunt faced working end and an angular edge, which comprises adjusting the said edge of the tool into proximity with a surface of the work piece to be shaped, advancing the tool and workpiece relative to each other in a direction to cause penetration of the tool edgewise into the workpiece, flooding the surfaces between the tool and workpiece by the act of forcing a liquid suspension of a comminuted abrasive, rapidly reciprocating the tool along its axis during said advance and flooding, and further advancing the tool and workpiece relative to their proximity to each other in a straight line direction oblique to the axis of tool reciprocation and to the plane of the tool end.

5. In a machine of the character described the combination of a resonant, ultrasonic frequency, vibratory, blunt-faced tool having an angular edge and adapted for movement into proximity with and to penetrate the workpiece to form a V-shaped incision therein, and means to flow a liquid suspension of a finely divided abrasive between the tool and said workpiece, means to ultrasonically vibrate said tool and to extend said incision by movement of the work along a straight-line path transverse to and divergent from the direction of vibration of the vibrating tool.

6. A machine for removing material from a hard, substantially non-yielding workpiece comprising a transducer, a blunt ended tool, means for transmitting high frequency vibrations from the transducer to the tool including a hydraulic coupling system constructed and arranged to increase the force while decreasing the amplitude of the vibratory impulses transmitted, a workpiece holder adaptable to hold and to move the workpiece relative to the tool, means for exerting a continuous straight-line pressure urging said holder workpiece and tool toward one another in a direction oblique to the direction of vibration of the axis of said tool, and means to force a liquid suspension of a finely divided abrasive between the adjacent surfaces of the tool end and workpiece.

7. In a machine for high frequency vibratory abrasion comprising a hydraulic power transmission device, a conduit containing a liquid column, a movable closure for one end of said column connected to a cutting tool outside said conduit, means at the other end of said conduit for imparting resonant, ultrasonic frequency alterations of pressure in said liquid for delivery therethrough to said tool, a hydrostatic pressure control device branching off from said liquid column and means therein to vary the said pressure to that which maintains conditions of mass-unit action in said device, a workpiece holder adapted to move and urge a workpiece into proximity to the end of the cutting tool, and means to flow a liquid suspension of a finely divided abrasive between the adjacent surfaces of the tool end and said workpiece.

8. An apparatus as claimed in claim 7, in which the liquid column is an emulsion.

9. In a machine for shaping hard surfaces, a chamber having a movable wall therein intermediate the ends thereof, fixed closures for the ends of said chamber, a transducer mounted on one of said fixed closures, said transducer having less cross-sectional area than the cross-sectional area of said movable wall, a body of liquid in the space between said end closure carrying the transducer and said movable wall, a body of gas in a space between said movable wall and the opposite end closure of said chamber, means for controlling and elevating the pressure of the gas in said space to that which establishes and maintains a condition of mass-unit movement in said body of liquid, a tool for shaping the surface to be shaped outside of said chamber and means for transmitting force from said movable wall to said tool.

10. A device for shaping a blank of hard material by high-frequency vibratory abrasion involving hydraulic transmission and amplification of power, which comprises a casing having rigid walls and ends, said casing containing a liquid column, a movable piston within the casing and in contact with one end of the column, resilient means, including a body of gas under pressure, backing the said piston, means to impart high-frequency periodic power strokes to the liquid at the other end of said column, for delivery and amplification through it to the resiliently backed piston, a pressure control device branching off from and in communication with said liquid column and casing and from said resilient body of gas, thus establishing means to develop controlled, balanced pressure on both sides of said resiliently backed piston, means within said control device, bearing down upon its liquid and said hydraulic column of liquid and body of gas, to develop and maintain said column and gas body at a pressure sufficient to give said column a resonant frequency exceeding that of the strokes imparted thereto by said stroke imparting means, thereby insuring rigidity of the column and mass-unit action in its transmission and amplification of power, a blunt-ended cutting tool rigidly connected to said movable closure and means therefor extending through a stuffing box and the lower, rigid end of said casing, means to amplify hydraulically the power imparted through said liquid column by said stroke imparting means, and means to force through said piston and tool a liquid slurry containing finely divided abrasive particles and to maintain a rapidly flowing, vibrating film of said slurry between said tool end and the adjacent portion of the work piece thereby to cut material therefrom, to cool said device, and to remove the detritus as formed.

11. The method of removing material from a hard, substantially non-yielding solid body to make an elongated incision in the surface of the treated region, which comprises imparting to the end portion of the tool member a beveled planar face having a cutting edge, applying said tool face edgewise to the surface of said solid body and with the plane of said face forming an angle of not less than 45 degrees with the plane of said surface, while holding said tool against rotation, and against contact with said surface, and forcing between the tool face and the work a liquid suspension of a finely comminuted abrasive, engendering at the area of near contact a relative oscillation of high frequency and minute amplitude and having a major component of movement oblique to the direction of application of said tool, and relatively advancing the tool into the work in a continuous, undeviating path, parallel to the surface, as the abrasive progressively removes material from the work at the area of contact.

12. The method of shaping metals or other hard substances as by cutting abrasion in lathes, which includes generating high-frequency oscillatory vibrations in a tool involved in the shaping operation, rotating the substances to be shaped around an axis offset from and angular to the axis of tool vibrations, avoiding contact between the tool end and said substance forcing therebetween a cutting medium comprising comminuted abrasive carried in a liquid.

13. The method of shaping metals or other hard substances as by cutting abrasion in lathes, which includes generating high-frequency oscillatory vibrations in a tool involved in the shaping operation, rotating the substances to be shaped around an axis offset from and parallel to the axis of tool vibrations, avoiding contact between the tool end and said substance forcing therebetween a cutting medium comprising comminuted abrasive carried in a liquid.

14. The method of machining as claimed in claim 13 in which the axis of tool vibration is inclined at an obtuse angle to the direction of the motion of translation.

15. The method of machining as claimed in claim 13 in which the line at which pressure is applied between the face of the tool and the face of the material being removed is oblique to the direction of the motion of translation, and the axis of tool vibration forms a right angle with the direction of motion of translation.

16. The method of machining a surface of a blank of hard material which consists in supporting the blank in proximity to the working face of a blunt-faced tool, producing a motion of translation between the end of the tool and the surface to be machined parallel to said surface, imparting a high-frequency vibratory motion to said tool in a direction at an angle to the direction of translatory movement, and maintaining a slurry of abrasive material between the working face of the tool and a working face of the cut in the material being removed from the surface to be machined, whereby the abrasive particles suspended in the slurry and between the face of the tool and face of the work cut confronting one another are driven against the said cut to abrade and remove material therefrom, the line of application of pressure between the blunt tool face and the face of the cut and the direction of vibratory motion of the tool being so related that there is a component of pressure between the face of the tool and the face of the material being removed which is inclined at an obtuse angle to the direction of the motion of translation.

17. The method of machining as claimed in claim 16 in which the line at which pressure is applied between the face of the tool and the face of the material being removed forms a right angle with the axis of tool vibration.

18. The method of machining as claimed in claim 16 in which the plane of the face of the material being removed forms a right angle with the direction of the motion of translation.

19. A machine for machining a surface of hard material comprising a tool support and a work piece support and means for producing a motion of translation between said tool and work in a direction parallel to avoiding contact of the tool with the surface to be machined, a blunt-faced tool carried by the tool support and means for imparting a resonant, ultrasonic frequency vibratory motion to the tool in a direction axially of the tool and at an obtuse angle to the motion of translation between the tool and surface to be machined, the blunt working face of the tool lying in a plane forming a right angle with the axis of the vibratory motion of the tool, and means to supply a liquid suspension of a finely divided abrasive between the adjacent surfaces of the tool and work piece, whereby the abrasive particles suspended in the slurry and between the face of the tool and face of the work cut confronting one another are driven against the said cut to remove material therefrom.

20. A machine for machining a surface of hard material comprising a tool support and a work piece support and means for producing a motion of translation between said tool and work in a direction parallel to avoiding contact of the tool with the surface to be machined, a blunt-faced tool carried by the tool support and means for imparting a resonant, ultrasonic frequency vibratory motion to the tool in a direction axially of the tool and at an obtuse angle to the motion of translation between the tool and surface to be machined, the working face of the blunt tool lying in and adapted to be advanced in a plane substantially normal to the surface to be machined, and means to supply a liquid suspension of a finely divided abrasive between the adjacent surfaces of the tool and work piece, whereby the abrasive particles suspended in the slurry and between the face of the tool and face of the work cut confronting one another are driven against the said cut to remove material therefrom.

21. A machine for machining a surface of hard material comprising a tool support and a work piece support and means for producing a motion of translation between said tool and work in a direction parallel to avoiding contact of the tool with the surface to be machined, a blunt-faced tool carried by tool support and means for imparting a resonant, ultrasonic frequency vibratory motion to the tool in a direction forming a right angle with the direction of the motion of translation between the tool and surface to be machined, the tool having a working face lying in a plane forming an oblique angle between the direction of the motion of translation and the axis of vibratory motion of the tool, and means to supply a liquid suspension of a finely divided abrasive between the adjacent surfaces of tool and work piece, whereby the abrasive particles suspended in the slurry and between the face of the tool and face of the work cut confronting one another are driven against the said cut to remove material therefrom.

22. A machine for removing material from a hard, substantially non-yielding work piece by impact abrasive cutting, which comprises a transducer, a blunt-ended tool, means for transmitting vibrations at resonant, ultrasonic frequencies from the transducer to the tool, a work piece holder adapted to hold and to move a work piece relative to the tool and in proximity to the tool, means to circulate a liquid suspension of a finely divided low-density abrasive and to cause it to flow between the adjacent surfaces of the tool end and work piece and thus to wear away said work piece surface in the form of minute, dense work piece particles which accumulate in said liquid suspension, in combination with means to settle out and thus to remove said dense abraded particles from said liquid suspension during its circulation, which means comprises an upright tank provided with a liquid circulating pump which discharges the liquid upwardly into the said tank above the lower portions thereof and above any layer of sediment therein, and an outlet from said tank connected to the upper portion thereof which discharges said liquid suspension clarified of high density abraded particles into the space between the tool end and the adjacent work piece surface.

23. In the shaping of metals or other hard dense work pieces by means of ultrasonic impact abrasion thereon of finely divided relatively low density abrasive particles suspended in a liquid and circulated in the space between the end of a resonant ultrasonically vibrating tool and the adjacent work piece surface, as described in claim 19 in which the abraded dense particles of said work piece are settled out in a sedimentary layer from a body of said liquid during recirculation, and the upper clarified layer of liquid is delivered to the said space between the said tool end and the adjacent work piece surface.

References Cited in the file of this patent

UNITED STATES PATENTS

| | | |
|---|---|---|
| Re. 23,657 | Bodine | May 19, 1953 |
| 498,721 | McKay | May 30, 1893 |
| 960,526 | Erlandsen | June 7, 1910 |
| 1,399,108 | Garrison | Dec. 6, 1921 |
| 1,438,285 | Anderson | Dec. 12, 1922 |
| 1,535,411 | Hansen | Apr. 28, 1925 |
| 1,690,457 | Pennock | Nov. 6, 1928 |
| 1,857,624 | Degenhardt | May 10, 1932 |
| 2,092,721 | Arter | Sept. 7, 1937 |
| 2,168,806 | Reilly | Aug. 8, 1939 |
| 2,324,374 | Eden | July 13, 1943 |
| 2,333,304 | Ernst | Nov. 2, 1943 |
| 2,402,554 | Foulds | June 25, 1946 |
| 2,452,211 | Rosenthal | Oct. 26, 1948 |
| 2,580,716 | Balamuth | Jan. 1, 1952 |
| 2,631,148 | Carwile | Sept. 8, 1953 |

FOREIGN PATENTS

| | | |
|---|---|---|
| 2,238 | Great Britain | Aug. 30, 1866 |
| 12,658 | Great Britain | Aug. 10, 1889 |
| 493,697 | Great Britain | Oct. 10, 1938 |
| 524,141 | Germany | May 2, 1931 |
| 542,365 | Great Britain | Jan. 6, 1942 |